Figure 1:
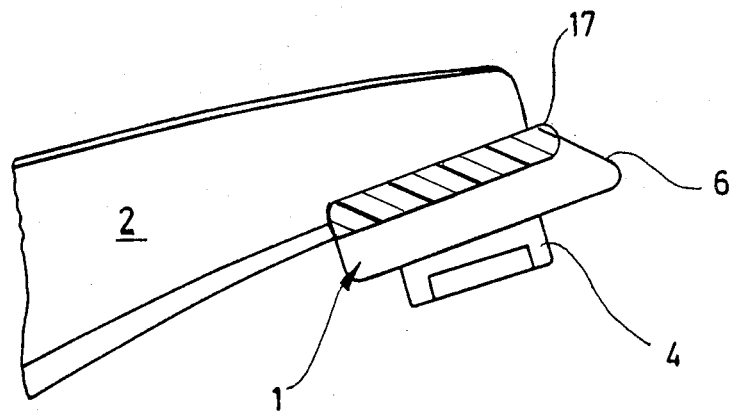

United States Patent [19]

Ostertag et al.

[11] Patent Number: 4,630,940
[45] Date of Patent: Dec. 23, 1986

[54] TEMPERATURE DISPLAY DEVICE FOR ATTACHMENT TO A WATER OUTLET

[76] Inventors: Ulrich K. Ostertag; Reinhard F. Ostertag, both of Eibenweg 10, D-7000 Stuttgart 70, Fed. Rep. of Germany

[21] Appl. No.: 638,515

[22] Filed: Aug. 7, 1984

[30] Foreign Application Priority Data

Aug. 10, 1983 [DE] Fed. Rep. of Germany ....... 3328782

[51] Int. Cl.$^4$ .................. G01K 1/14; G01K 13/02
[52] U.S. Cl. ................................. 374/148; 73/198
[58] Field of Search ............. 73/198, 861.77; 239/71, 239/74, 75, 428.5; 374/142, 147, 148

[56] References Cited

U.S. PATENT DOCUMENTS

| | | | |
|---|---|---|---|
| 2,372,606 | 3/1945 | Sammis | 73/861.65 X |
| 3,581,568 | 6/1971 | Pfefer | 374/148 |
| 3,635,086 | 1/1972 | Beruch | 374/148 |
| 4,253,341 | 3/1981 | Ikeda et al. | 73/861.77 |
| 4,456,174 | 6/1984 | Neenan | 239/428.5 X |
| 4,509,550 | 4/1985 | Monk | 374/148 X |

FOREIGN PATENT DOCUMENTS

| | | |
|---|---|---|
| 1965194 | 3/1967 | Fed. Rep. of Germany . |
| 7417168 | 5/1974 | Fed. Rep. of Germany . |
| 8301168 | 1/1983 | Fed. Rep. of Germany . |

Primary Examiner—Herbert Goldstein
Attorney, Agent, or Firm—Fred Philpitt

[57] ABSTRACT

A device for measuring and displaying one or a plurality of characteristic parameters of water flowing through the spout of a sanitary valve is formed as an integral self-contained unit. The unit comprises a housing formed with an axial passage. One or a plurality of sensors responsive to the parameters of interest communicate with this passage. The value of the parameter of interest, particular the temperature of the water, is displayed by a display unit also integrated into the housing of the device. A connecting stud of the housing can be screwed into the outlet opening of a standard sanitary valve.

8 Claims, 7 Drawing Figures

TEMPERATURE DISPLAY DEVICE FOR ATTACHMENT TO A WATER OUTLET

DESCRIPTION

The invention relates to a device for measuring and displaying one or a plurality of characteristic parameters of water flowing through the spout of a liquid valve.

For various purposes, particularly for determining the temperature of water supplied from a liquid valve, it is desirable to directly determine and display the value of a physical parameter of water discharged from a liquid valve. So it is desirable to determine the temperature of water used for washing textiles in a wash basin, since there are predetermined washing temperatures prescribed by the producers of textiles. Also the temperature of water provided by bath tub faucets and shower valves often must be controlled within narrow limits in view of the user's health and in view of therapeutic purposes. It is less desirable to control the temperature of water already contained in the wash basin or the bath tub, since this control can only be effected after a certain amount will have been accumulated. Furthermore, there may be temperature gradients within the accumulated water due to successive charges of water of different temperature having been supplied, said portions being still imperfectly mixed. Adjusting the temperature of a volume of water already contained in a wash basin or a bath tub is also difficult, since it is generally difficult to correctly estimate the additional volume of water of different temperature required to obtain a mix of the desired temperature. Furthermore, if the water provided by the liquid valve is not accumulated, as will be the case when washing one's hands, it is impossible to measure the temperature of the water using a thermometer floating in the wash basin or the bath tub. However, in such cases, too, monitoring of the temperature is very desirable, particularly since the temperature of water supplied from a liquid valve may vary as a function of time. So, even if an agreeable temperature has already been adjusted, the temperature may have increased considerably, when the hands are again positioned below the faucet after applying soap thereto so that there is a danger of scalding.

German Utility Model No. 83 02 054 discloses a thermostatic valve comprising a temperature sensor arranged in the vicinity of a mixing chamber, a display unit arranged in an end face of the operating handle being electrically connected to this sensor. Thus, the temperature of the water discharged can be visualized. Thermal coupling of a temperature sensor to the water contained in the mixing chamber of a valve is, however, objectionable. Furthermore, in most sanitary valves it is difficult to provide an electric connection between a sensor arranged in the mixing chamber of the valve and an operating handle of this valve, since the operating handle is movable with respect to the stationary valve body. Such known sanitary valves including a temperature display unit are special and costly productions limited to a particular type of valve.

Accordingly, it is an object of the present invention to provide a device for measuring and displaying one or a plurality of characteristic parameters of water flowing through the spout of a liquid valve combining the features of good coupling of the sensor to the water flow, clear display of the monitored value of the physical parameter and ease of mounting on a variety of different liquid valves of different producers.

To this end the invention provides a device of the kind referred to above, wherein the sensor, the display unit and electric components required to warrant correct operation of sensor and display unit are integrated into a housing being formed with a passage receiving the water supplied from the spout of the liquid valve.

In a device in accordance with the present invention, the display units, the sensor viz. the sensors and eventual electronic components are packed into a small housing. The unit thus formed is mounted to the outlet opening of the liquid valve, thus requiring no modifications of the liquid valve, the water to be monitored being easily accessible at such location. The device in accordance with the present invention can be used in connection with a variety of liquid valves, in connection with one or two handle valves, thermostats, bath tub valves or the like produced by different firms. Thus, the device can be produced in large rates. There are no particular difficulties as providing access to the mixing chamber of a valve or providing an electric connection between the sensor and the associated display unit.

A device in accordance with the present invention may readily be used in connection with already installed valves.

Generally modern liquid valves have an air admixing or bubble forming unit mounted to the outlet opening of the spout thus providing a soft stream of water. The valves have their outlet openings formed with threadings so that the air admixing unit can be simply screwed into the valve. In accordance with a further aspect of the present invention the housing of the measuring and display device is formed with a connecting stud having exterior threadings such that the device can be screwed into the threadings formed in the outlet opening of the valve's spout. If the housing of the measuring and display device furthermore includes an outlet opening formed with threadings corresponding to the threadings of the valve's outlet opening, the air admixing unit can be simply screwed to the outlet opening of the device thus being similarly arranged and orientated while being lowered by a few millimeters. Thus, the entire sanitary valves can be operated and used in usual manner.

In accordance with a further aspect of the invention the end face of the device's housing including the display unit is inclined with respect to the axis of the passage thereof lying between 40° and 70° and preferably being equal to about 45°. By such choice of the inclination of the display unit the display unit can be easily read when mounted on a usual faucet considering the usual orientation of the axis of the outlet opening thereof. Furthermore, the free surface of the display unit will be sufficiently inclined with respect to a horizontal plane, when a device is mounted on a liquid valve so that water which may have accumulated thereon will drain off under gravity.

In accordance with a further aspect of the invention, the display unit is of the digital type so that the value of the monitored parameter can be easily read in the usual distance between the user's eye and the spout of the liquid valve, even if the size of the characters displayed is significantly smaller than 1 cm.

If the sensor is chosen to be a flow responsive sensor, electronic components of the device may include a resettable integrating circuit receiving the output signal of the flow rate sensor, and in such case the output signal of the integrating circuit may be selectively displayed by the display unit. Thus a combined flow rate and flow meter is provided which can be easily mounted on a valve and can provide information as to the overall volume of water discharged since the integrating circuit has been reset.

Preferably the display unit is formed by a liquid crystal display unit. A characteristic feature of such liquid crystal display units is their extremely low energy consumption contributing to a long life of batteries used for energizing the electronic components of the measuring and display device.

In accordance with a further aspect of the present invention a second sensor may be arranged in the passage of the device's housing, such sensor being responsive to the fact of a flow of water occurring in said passage. A corresponding sensor may be formed by a pressure or flow responsive switch closing the electric connections between the battery and the electronic components energized thereby. Thus, the device is activated only when working thereof is actually desired.

If the connecting stud is formed with exterior threadings corresponding to the standard mounting threadings of air admixing and bubble forming soft jet units, the device can be easily mounted on all such known valves.

It is furthermore considered that only limited rotation of the connecting stud with respect to the housing of the device is allowed for so that the connecting stud can be screwed into the outlet opening of the liquid valve in usual manner, the user's hand turning the housing of the device. As soon as the relative play between the connecting stud and the housing is eliminated, the torque exerted by the user's hand onto the housing is transferred to the connecting stud, which thus is screwed into the threadings of the outlet opening of the valve. Removal of the device from the valve can be effected by turning the housing in the opposite sense. Yet the housing of the device and thus the display unit can be given almost any desired angular orientation with respect to the spout of the liquid valve.

In accordance with a further development of the invention, the upper surface of the housing of the device is provided with an elastic pad made from rubber or resilient plastic material and having an opening adapted to receive the connecting stud of the housing. This elastic pad engages the lower surface of the spout of the liquid valve in the mounted state of the device thus compensating various shapes of the valve body.

In accordance with a further development of the invention, the display unit and the associated electronics as well as the sensor are integrated into a drawer-like housing received in a mating recess of the housing of the device. Thus the fluidic part and the electronic part of the device can be completely prefabricated leaving a simple final assembling step.

Figure 2:
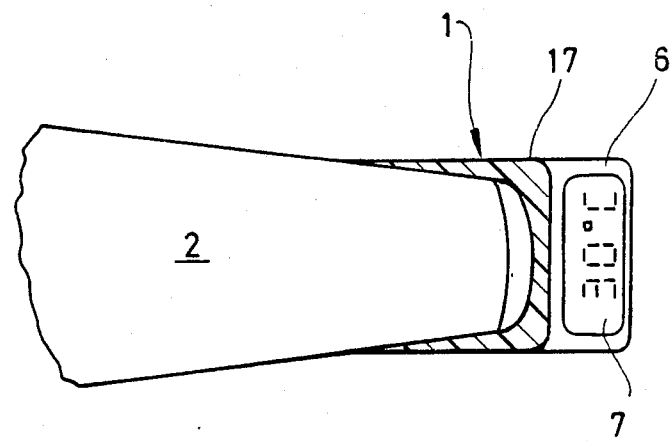
Figure 3:
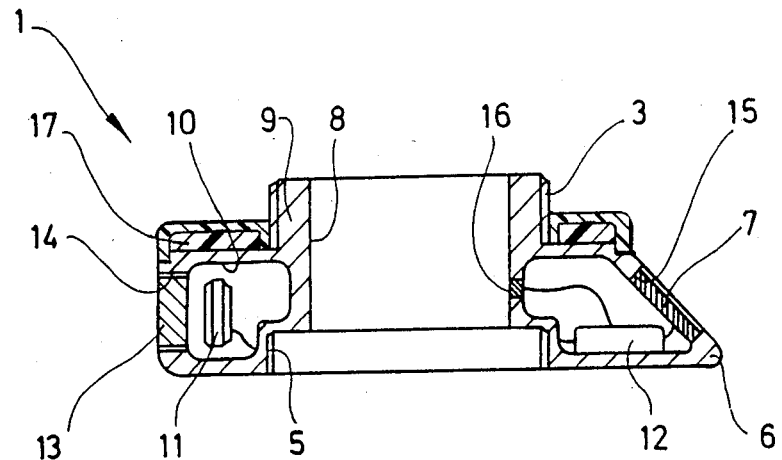
Figure 4:
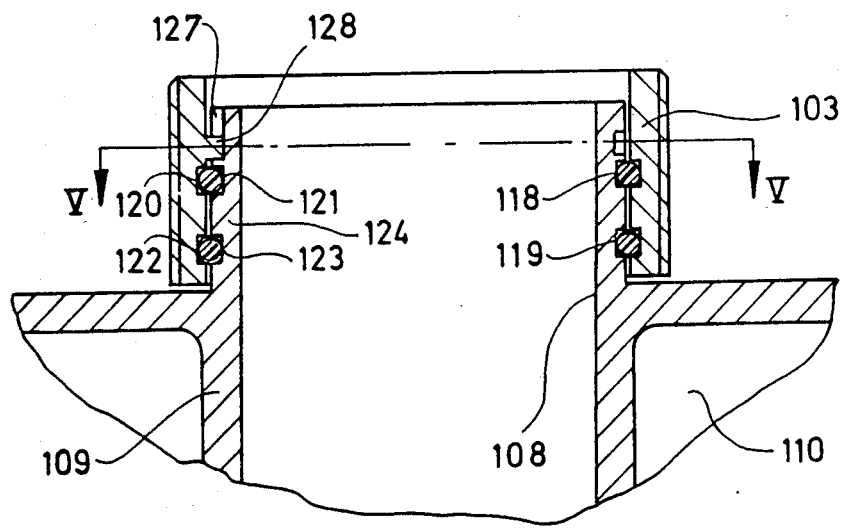
Figure 5:
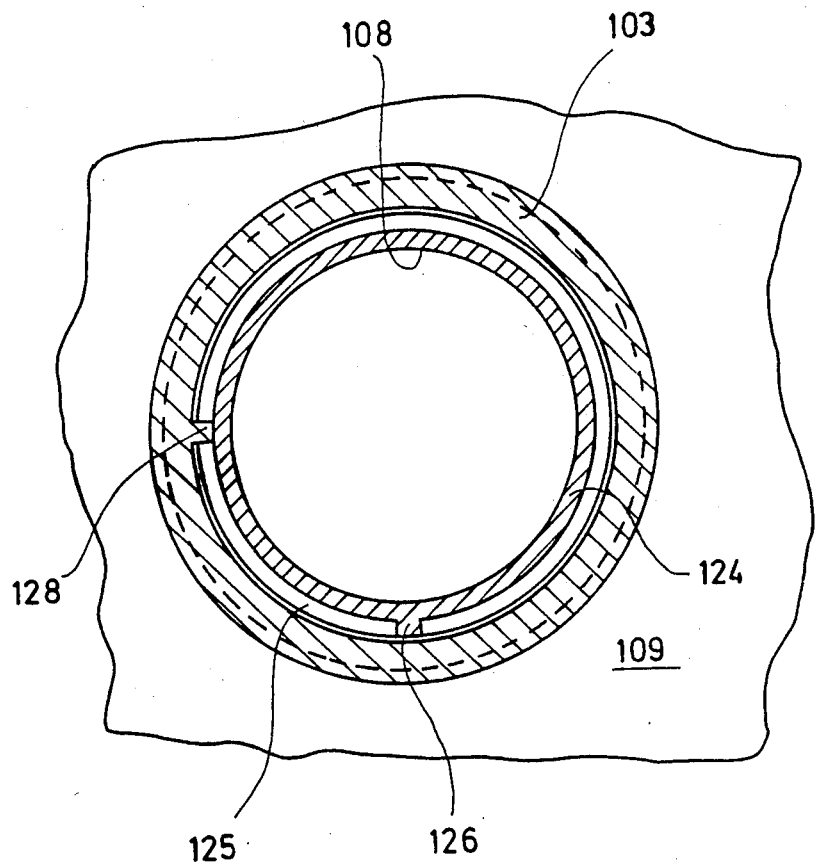
Figure 6:
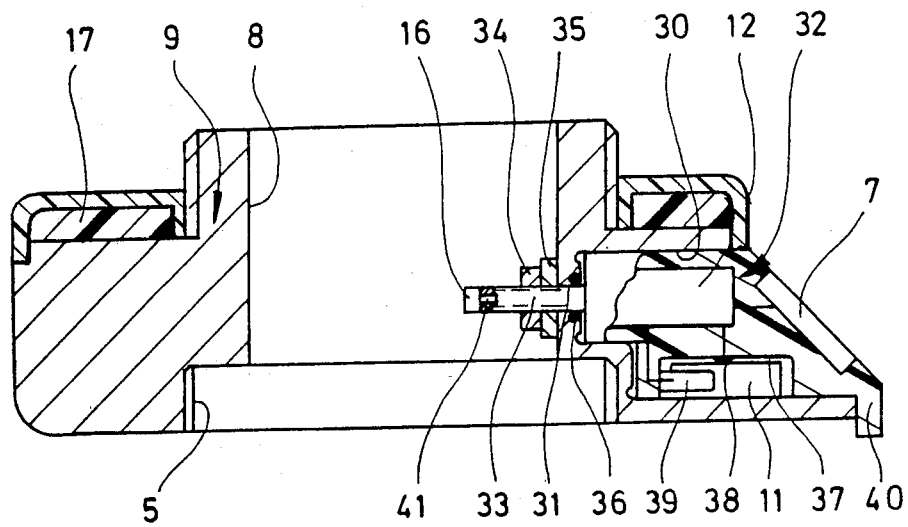
Figure 7:
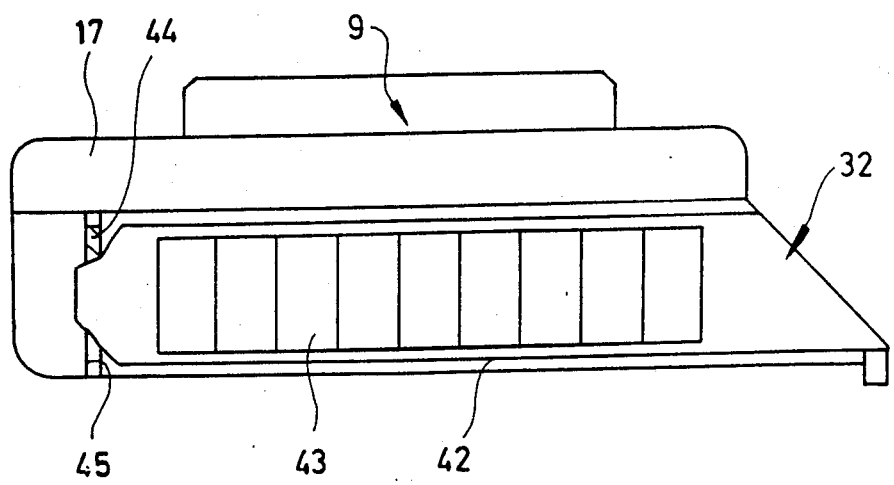

Further details of the invention will become apparent from the below detailed description of preferred embodiments referring to the drawings. Therein FIG. 1: is an elevational view of the spout of a liquid valve and a measuring and display device mounted thereon;

FIG. 2: a top view of the arrangement shown in FIG. 1;

FIG. 3: an axial sectional view of a first embodiment of the measuring and display device;

FIG. 4: an axial partial sectional view of the connecting stud of a second embodiment;

FIG. 5: a sectional view along line V—V of FIG. 4;

FIG. 6: an axial sectional view of a further modified measuring and display device; and FIG. 7: an elevational view of a still further modified measuring and display device.

In FIGS. 1 and 2 a temperature measuring and display device or a thermometer unit is generally shown at 1. The thermometer unit is mounted on the spout 2 of a liquid valve. The water outlet opening of spout 2 is formed with threadings not shown in detail which normally serve for screwing in an air admixing and bubble forming soft jet unit. In the arrangement shown thermometer unit 1 is screwed into the outlet opening of spout 2, while a commercial soft jet unit 4 is screwed into a corresponding threaded outlet opening of thermometer unit 1. Thus the stream of water exiting from spout 2 will flow through the thermometer unit 1 and thereafter through the soft jet unit 4. Soft jet unit 4 thus has a position being a few millimeters lower than in the usual arrangement.

The thermometer unit 1 continuously measures the temperature or a different physical parameter of the water flowing therethrough and continuously displays the value of this parameter. While temperature is considered the parameter of interest in the below text, it should be noted that other parameters which can be monitored and displayed are e.g. the velocity of the stream of water, the flow rate or a parameter being derived from the above parameters as the overall volume of the water discharged, the overall heat contents of hot water discharged or the like.

For display purposes the therometer unit 1 is formed with a ramp-shaped or inclined end face 6 including a display panel 7.

The interior structure of the thermometer unit 1 will now be described referring to FIG. 3.

Thermometer unit 1 is a compact sealed one-piece structure and has a housing 9 receiving all the required functional components. A threaded connecting stud 3 serves for mounting of housing 9 to the above mentioned threadings of spout 2, simultaneously providing a fluid tight connection between spout 2 and a short linear passage 8 extending through housing 9. A flat packing (not shown) is sandwiched between connecting stud 3 and spout 2 as usual. Housing 9 is cast from metal or molded from plastic material, and passage 8 extends from connecting stud 3 to a threaded counterbore 5 forming an outlet opening of the thermometer unit 1. Threaded counterbore 5 exactly corresponds in shape to the threaded outlet opening of spout 2 so that a soft jet unit 4 can be screwed into counterbore 5, a flat packing being sandwiched between soft jet unit 4 and thermometer unit 1.

An annular cavity 10 surrounds passage 8 and houses all the electronic components required for controlling and operating the display panel 7. In the embodiment shown, a round cell 11 and an integrated circuit 12 energized thereby are received in cavity 10. A temperature sensor 16 is arranged in the wall separating cavity 10 and passage 8, the end face of temperature sensor 16 being flush with the wall of passage 8. Temperature sensor 16 thus responds to the temperature of water passing by and provides a corresponding electric output signal supplied to the integrated circuit 12. Integrated circuit 12 processes this signal and provides an appropriate control signal fed to the display panel 7. Display panel 7 is a digital liquid crystal display panel which will consume only very little energy. The round cell 1 is accessible through an opening 14 of housing 9, which in operative condition of thermometer unit 1 is sealingly closed by a threaded closure plug 13. The display panel 7 is sealingly mounted in a window 15 of housing 9, e.g. by means of an adhesive or a transparent varnish or the like.

A pad 17 made from soft rubber or soft plastic material or an elastic sleeve overlies the upper surface of housing 9 as shown in FIG. 3. Connecting stud 3 extends through an opening formed in pad 17. In the spout mounted state of the thermometer unit 1 pad 17 engages the lower surface of spout 2 under elastic deformation thus conforming to different shapes thereof and allowing use of a single type of thermometer unit in connection with different types of sanitary valves.

The end face 6 of housing 9 carrying the display panel 7 defines a plane being inclined with respect of the axis of passage 8 by an angle of about 45°. Since in most cases the angle defined between the axis of the threaded outlet opening of spout 2 and the vertical direction is an acute angle as shown in FIG. 1, the above mentioned inclination of the display panel 7 warrants that the surface of display panel 7 is still inclined in forward and downward direction so that splash water will drain off due to gravity while the display is well readable and the digits displayed are easy to identify by a user.

In the modified embodiment shown in FIGS. 4 and 5 parts corresponding to parts already explained above have reference numerals fixed thereto which have been augmented by 100.

In the embodiment shown in FIG. 3, the angular position of the thermometer unit 1 depends on the angular relative position of the cooperating threadings of connecting stud 3 and the outlet opening of spout 2 and is also a function of the axial dimension of the flat packing sandwiched between thermometer unit 1 and spout 2. Thus under unfavorable conditions the display unit 7 may not be exactly symmetric with respect to the symmetry plane of spout 2, after connecting stud 3 has been tightly screwed into the outlet opening of spout 2. In this context it should be noted that by varying the extent of compression of the above mentioned flat packing the angular orientation of thermometer unit 1 with respect to spout 2 can be adjusted in a very narrow range only. In order to overcome this problem, connecting stud 103 shown in FIGS. 4 and 5 is a separate annular or sleeve-shaped part adapted for relative rotation with respect to housing 109, exterior threadings being again formed thereon.

Two O-ring seals 118, 119 engage in adjacent grooves 120, 121, 122 and 123 formed in the interior circumferential surface of connecting stud 103 and the outer circumferential surface of a cylindrical collar 124, respectively, collar 124 being formed integral with housing 109. The O-ring seal and groove arrangement is multifunctional: it will provide seals between the connecting stud 103 and collar 124. Furthermore, it will provide positive axial positioning of connecting stud 103 with respect to collar 124 and thus housing 109. Finally the arrangement forms a friction brake, the braking force of which can be adjusted by appropriate choice of the hardness of the O-ring seals 118, 119 and of the dimensions of O-ring seals 118, 119 in such manner that inadvertent rotation of housing 109 with respect to connecting stud 103 and consequently with respect to spout 2 is eliminated.

A further groove 125 is cut into the exterior circumferential surface of collar 124 being situated above the O-ring seals 118, 119, as may be seen from FIG. 5. Groove 125 is not completely closed in circumferential direction, an axial rib is left between the opposing ends of groove 125. An axial groove 127 is formed in the outer circumferential surface of collar 124 (see FIG. 4) and provides a connection between groove 125 and the upper end face of collar 124.

The interior circumferential surface of the connecting stud 103 is formed with a web 128 which is moved into the groove 125 via the axial groove 127, when the connecting stud 103 is applied over the collar 124.

The arrangement formed by groove 125, rib 126 and web 128 is provided for the below purpose:

Since the upper surface of thermometer unit 1 viz. the pad 17 arranged thereon is to be brought in tight sealing contact to the lower surface of spout 2, it is impossible to grasp the connecting stud 103 with a spanner or the like. Instead, the thermometer unit 1 must be screwed into spout 2 manually applying torque to the housing 9. To this end the connecting stud 103 is first brought in contact to the threaded outlet opening of spout 2. Thereafter, the housing 9 is turned in clockwise direction as seen from the lower surface of thermometer unit 1. This rotation will first result in a relative rotational movement between housing 109 and connecting stud 103 until web 128 will have reached one end of groove 125 engaging rib 126. Upon further rotation of housing 109 connecting stud 103 will be rotated in unison therewith and will be threaded into the outlet opening of spout 2 until the desired compression of the flat packing sandwiched therebetween will be achieved. Thereafter the housing 109 is rotated in the opposite direction, the connecting stud 103 remaining stationary until the end face 6 and consequently display panel 7 are orientated in the desired direction.

Thermometer unit 1 can be removed from spout 2 in similar manner: housing 109 is manually rotated in anti-clockwise manner as seen from the lower surface of the unit. This rotation will first result in a relative rotational movement between housing 109 and connecting stud 103 until web 128 of the connecting stud 103 will arrive at the second end of groove 125 and engage rib 126. Upon further rotation of housing 109 the connecting stud 103 will be screwed off from the outlet opening of spout 2.

In a modified further embodiment not shown in the drawings, the temperature sensor 16 may radially extend into the passage 8 so that an improved thermal coupling to the flow of water is obtained. Furthermore, a micro switch or a pressure responsive switch of the diaphragm type is provided on the wall of passage 8. This switch will establish an electric connection between the round cell 11 and the integrated circuit 12 only, if there is a flow of water through passage 8. Consequently, the operative lifetime of round cell 11 is increased.

In order to improve thermal isolation of the electronic components 11, 12, particularly round cell 11 from the flow of water through housing 9, a thermally isolating plastic material is inserted or injected between these components and the walls of housing 9.

The display panel 7 has an additional particularly conspicuous optical signal function which will be activated upon a temperature of the water exceeding a predetermined temperature engendering the danger of scalding. This additional optical signal function can be warranted by a light emitting diode or by switching the display panel 7 into an intermittent or blinking display mode. The integrated circuit 12 then includes a comparator circuit receiving the output signal of temperature sensor 16 and a respective reference signal.

In a further modified embodiment of thermometer unit 1 being similar to the unit shown in FIG. 1, the unit additionally includes a flow rate sensor, the output signal of which is also supplied to the integrated circuit 12 and can be selectively visualized by display panel 7 so that a multifunction monitoring unit is provided. In the case of such multifunction monitoring unit the integrated circuit 12 further comprises an integrating circuit receiving the output signal of a flow rate sensor and providing a signal corresponding to the total flow of water discharged. The integrating circuit can be reset to zero by actuating a switch having a freely accessible or alternately a concealed operating member.

In such a multifunction monitoring unit the output signal of a temperature sensor and the output signal of a flow rate sensor may additionally be multiplied, the resulting signal being supplied to a (further) integrating circuit. The output signal of the latter corresponds to the total amount of heat supplied together with the flow of water. This (further) integrating circuit can also be reset by an associated switch, and the output signal of this integrator can also be displayed on display panel 7 upon request.

In a further modified embodiment not shown in the drawings, a moving coil ammeter may replace the digital display unit, the temperature sensor being formed by a thermo couple. With this arrangement no separate energy supply and no separate electronic circuitry is required for monitoring the temperature of the water discharged from spout 2.

Reference is made to FIGS. 6 and 7 wherein parts already shown in FIGS. 1 to 3 have the same reference numerals affixed thereto. So thre is no need to explain these parts in detail again.

In the embodiment shown in FIG. 6, a recess 30 is provided in the housing 9. Apart from a hole 31 recess 30 is completely sealed from passage 8 while being open towards the circumferential surface of housing 9.

Recess 30 has a stepped longitudinal profile, and hole 31 merges into the rear portion of the bottom of recess 30. A drawer-like housing 32 molded from plastic material snugly fits into recess 30, a rod-shaped extension 33 thereof extending through hole 31 under close fit conditions. Extension 33 is formed with exterior threadings. A nut 34 is screwed onto extension 33, a washer 35 being arranged between nut 34 and the wall of passage 8. Washer 35 has a plane end face and an opposing end face the curvature of which corresponds to the radius of passage 8.

The drawer-like housing 32 is thus releasably fixed to housing 9, a further O-ring seal 36 completely sealing recess 30 with respect to passage 8. O-ring seal 36 is made from soft elastic material and can be substantially deformed in axial direction.

The integrated circuit 12 and the display unit 7 are embedded into the drawer-like housing 32. A battery chamber 37 is formed in the lower surface of housing 32. Contact springs 38, 39 cooperating with the circumferential wall viz. a bottom wall portion of the round cell 11 extend into the battery chamber 37. Thus the round cell 11 is frictionally retained within the battery chamber, when the drawer-like housing 32 is drawn out of the housing 9 for replacement of round cell 11 which will be possible after nut 34 has been screwed from extension 33.

The drawer-like housing 32 has a downward facing skirt 40 facilitating grasping thereof and simultaneously forming a caping facilitating draining off of splash water from the end face 6 without the risk of entering into the recess 30.

Electric connectors extending between the integrated circuit 12 and the round cell 11 viz. the display panel 7 are also embedded into the plastic material of the drawer-like housing 32 as has been schematically indicated by corresponding lines.

Electric connecting lines extending between the temperature sensor 16 and the integrated circuit 12 extend through an axial bore 41 of the extension 33. The free end of bore 41 is closed by temperature sensor 16 being fixed to extension 33 e.g. by an adhesive.

FIG. 7 shows a further thermometer unit, the interior structure of which corresponds to the embodiment shown in FIG. 6 apart from two details: nut 34 and battery chamber 37 are omitted. Two lateral arms are formed integral with the drawer-like housing 32, solar cells 43 being arranged at the outer surface of arms 42. The voltage provided by the solar cells 43 replaces the voltage provided by round cell 11. The free ends of the resilient arms 42 have a locking rib 44 formed integral therewith and facing one lateral surface of the box-shaped housing 9. Locking ribs 44 cooperate with associated locking grooves 45 formed in the opposing lateral surface of housing 9. Thus, the drawer-like housing 32 can be easily mounted on the housing 9 and removed therefrom without using a tool.

What is claimed is:

1. A device for measuring and displaying the temperature of the liquid flowing out of a spout that has an interiorly threaded outlet, which device comprises
   (a) a housing that includes
      (1) an inlet end,
      (2) an outlet end, and
      (3) a liquid passageway connecting said inlet end to said outlet end of said housing,
   (b) a connecting stud for connecting said spout to said housing, one end of said stud having exterior threading that is adapted to engage the interior threads on the outlet end of said spount and connecting means for connecting said connecting stud to the inlet end of said housing so that the connection therebetween will be fluid tight while still permitting rotational movement relative to each other around the same axis, said connecting means comprising at least one O-ring seal that engages into a groove formed in the circumferential surface of said connecting stud as well as into a groove formed in an opposing circumferential surface of said housing,
   (c) temperature sensor means mounted in said housing which can detect the temperature of the liquid flowing through said passageway,
   (d) digital display means located on an exterior portion of said housing to display a visible indication of the temperature, and
   (e) electrical means interconnecting said temperature sensor means with said digital display means.

2. The device as set forth in claim 1 which includes solar cells energizing the electric components.

3. The device as set forth in claim 1 wherein a second sensor is arranged in said passageway that is responsive to the water flow therein, the output signal of said second sensor activating said display means or a control circuit associated therewith.

4. The device as set forth in claim 1 which contains means for limiting the rotational movement of said connecting stud.

5. The device as set forth in claim 1 wherein the upper surface of said housing supports an elastic pad made from resilient material, said pad being formed with an opening being aligned with the passageway through said housing so as to positively and sealingly engage said spout.

6. The device as set forth in claim 1 wherein said display means and said electrical means are integral parts of a drawer-like subhousing, said housing being formed with a recess for receiving said drawer-like subhousing under close fit conditions, and said sensor means is carried by a rod-shaped extension of said drawer-like subhousing, said extension extending through a hole merging from the bottom of said recess and extending towards or into said passageway.

7. The device as set forth in claim 6 wherein at least one lateral arm is formed integral with said drawer-like subhousing overlying a lateral surface of said housing and being releasably locked thereon.

8. The device as set forth in claim 6 wherein said rod-shaped extension is formed with threadings carrying a fixing nut being supported from the wall of said passageway in said housing.

* * * * *